U. WEDGE.
MANUFACTURE OF ARSENIOUS OXID.
APPLICATION FILED NOV. 13, 1907.
900,138.
Patented Oct. 6, 1908.
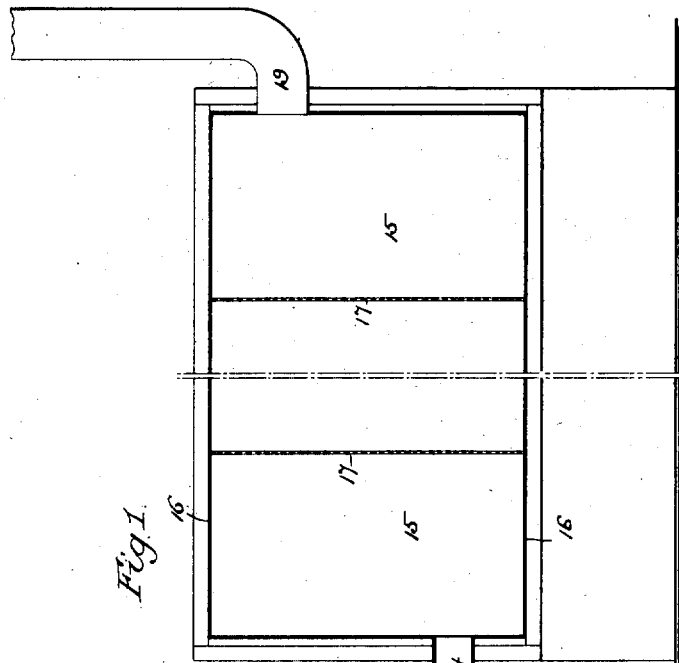
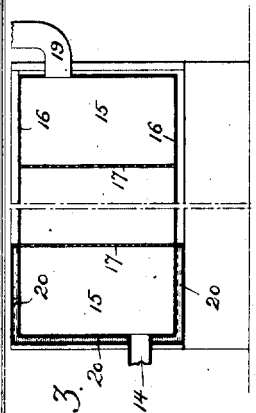
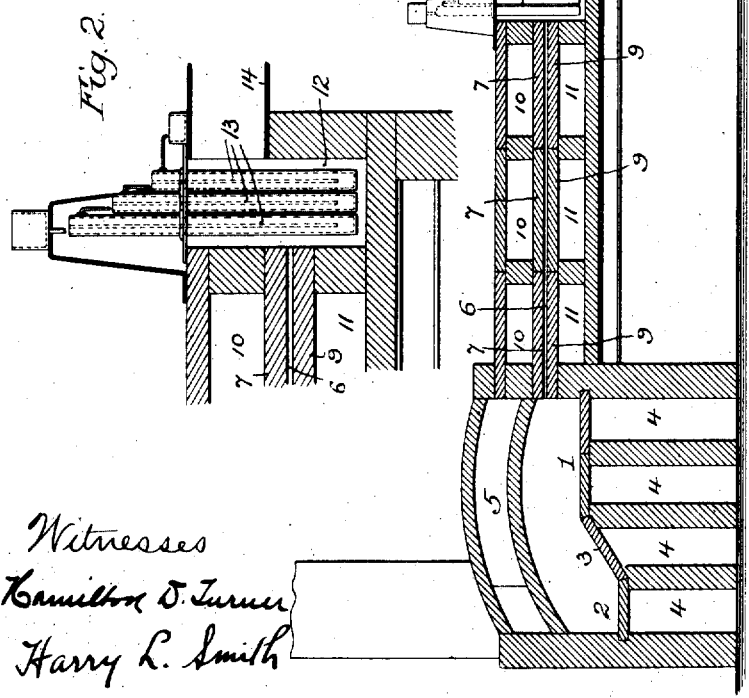
Witnesses
Hamilton D. Turner
Harry L. Smith
Inventor
Utley Wedge
by his attorney
Smith & Frazier

UNITED STATES PATENT OFFICE.

UTLEY WEDGE, OF ARDMORE, PENNSYLVANIA.

MANUFACTURE OF ARSENIOUS OXID.

No. 900,138.  Specification of Letters Patent.  Patented Oct. 6, 1908.

Application filed November 13, 1907. Serial No. 402,015.

*To all whom it may concern:*

Be it known that I, UTLEY WEDGE, a citizen of the United States, residing in Ardmore, Pennsylvania, have invented certain Improvements in the Manufacture of Arsenious Oxid, of which the following is a specification.

The object of my invention is to recover, in commercial form, the arsenious oxid contained in the sulfid of arsenic which is at present a waste product of sulfuric acid manufacture. This object I attain in the manner hereinafter set forth, reference being had to the accompanying drawing, in which—

Figure 1 is a longitudinal section of apparatus which may be employed in carrying out a certain part of the process forming the subject of my present invention; Fig. 2 is a sectional view, on an enlarged scale, of part of said apparatus, and Fig. 3 is a sectional view illustrating a modification of one of the features of my invention.

The sulfid of arsenic sludge resulting as a waste product in the manufacture of sulfuric acid always contains more or less free acid, and, in carrying out my present invention, I eliminate this free acid by first washing the sludge with water and then with a solution of some alkali, such, for instance, as soda ash, in order to neutralize all traces of free sulfuric acid remaining therein. When this has been accomplished, I then partially dry the sludge, preferably by means of an ordinary filter press, which also reduces the sludge to cake form, so that it can be conveniently handled. In this condition, however, it still contains about forty per cent. of moisture, and, in order to better effect the subsequent driving off, by heat, of the arsenic vapors or gases (hereinafter, for convenience, termed vapors) this moisture should be removed. This result I accomplish by drying the cakes of sludge at a temperature not high enough to vaporize the arsenic contained in the sludge, say at about 196° F.

After it has been thoroughly dried the sludge can be broken into pieces of any desired size and it will then burn freely in a furnace such as is illustrated in my application for patent, Serial No. 321,887, filed June 15, 1906, said furnace having a hearth with an elevated receiving member 1 and a discharging member 2 connected by an inclined member 3, said hearth being heated by products of combustion circulating beneath it through flues 4, and a reverberatory action being obtained by carrying the same, or other, products of combustion through a chamber 5 in the hollow roof of the furnace.

The sulfid of arsenic sludge which results as a waste product of sulfuric acid manufacture is usually a combination of the trisulfid and the pentasulfid, and, owing to the loosely combined atoms of sulfur in the latter, free combustion of the dry sludge, attended by the evolution of arsenious oxid vapor and sulfurous acid gas, will take place when said sludge is thrown and spread upon the upper member 1 of the hearth, and is exposed to the heat thereof and also to the heat radiated from the roof of the furnace.

The sludge can be readily drawn down over the inclined member 3 of the hearth and onto the base member 2 of the same, from which it can be removed after all of the vapors have been driven off. If a proper temperature is maintained the sludge can be effectively treated on a flat hearth, the hearth with inclined intermediate member being preferred, however, as more convenient.

In order to maintain the combustion of the sludge the hearth of the furnace should be heated to redness, and even in that case a quantity of yellow arsenic will vaporize as such without burning, and to secure a suitable product of white arsenic it is necessary to pass the vapors through a retort, which, as in my aforesaid furnace, consists of a contracted passage 6 between upper and lower slabs or tiles 7 and 9 interposed between upper and lower flues 10 and 11, through which heated products of combustion are caused to circulate, the retort being of such construction that there is no tendency of the combustion gases to leak into the arsenic vapors nor any tendency of the arsenic vapors to escape into the heating flues. The additional heat to which the yellow arsenic vapors are subjected in this retort is sufficient to cause the combustion of the same, consequently only the white arsenic vapors issue from the delivery end of the retort, the length of the retort being such as to insure this action. These vapors are, however, of such a high temperature that if permitted to pass directly into an ordinary condensing chamber, they will, in a short time, heat to a relatively high degree, the walls of said chamber, at and near the inlet, and form strongly adhering and hard crystalline masses on said walls, instead of depositing the arsenious oxid upon the floor of this portion of the chamber in the form of a finely divided powder, as is desired, and as is effected in the further portions of the chamber after the vapors have been partially cooled. I find it advisable, therefore, to so conduct the condensing operation that the vapors will, at the beginning of the operation be brought into contact with condensing surfaces so cooled that the objectionable results above noted will be prevented. In order to accomplish this, I preferably pass the heated vapors from the retort across a chamber 12 provided with depending tubes 13 through which a flow of water or other cooling agent is maintained in any suitable manner the temperature of the arsenic vapors being thereby properly reduced before they pass through the neck 14 into the condensing chamber 15.

The chamber 15 is contained, as usual, within a casing 16 exposed to the air, and composed of metal, brick, wood, or other available material, lead being preferred, and I also find it preferable to provide such chamber with one or more perforated transverse partitions 17, in order to check in some degree the freedom of flow of the arsenic vapor through the chamber from the inlet neck 14 to the outlet flue 19.

The cooling device interposed between the retort and the condensing chamber should not be such as to cool the arsenic vapors to an extent which will cause precipitation of the arsenious oxid in such cooler. It is desirable, however, to cool the vapors so that the temperature of the same at the forward end of the condensing chamber will not exceed 240° F. When this rule is observed, little or no arsenic will be precipitated in the cooler, the arsenious oxid being precipitated in the chamber 15, where it can be easily collected without interrupting the continued operation of the plant. The condensing chambers should have about two cubic feet of space per pound of dry sludge burned in twenty-four hours.

Instead of using a cooling device between the furnace and the condensing chamber, measurably the same effect may, if desired, be attained by providing the casing at the forward or receiving end of said chamber with pipes or passages, external or internal, for the flow of a suitable cooling agent a water jacket 20 being shown for this purpose in Fig. 3. By this means the undue heating of the walls of the chamber by contact with the hot gases is prevented, and the objections before noted are overcome.

I do not herein claim the mode of recovering arsenious oxid by first subjecting fused and flowing sulfid to the action of heat and then cooling the evolved gases to condense the same, or the further heating of said evolved gases before cooling them, as such treatment forms part of the invention constituting the subject of my previous application before referred to.

I claim:—

1. The process herein described of recovering arsenious oxid from the sulfid of arsenic sludge produced in sulfuric acid manufacture, said process consisting in neutralizing the sludge, then drying and burning the same, then condensing the resulting vapors to deposit the oxid, and then collecting the latter.

2. In the process of recovering arsenious oxid from the sulfid of arsenic sludge produced in sulfuric acid manufacture, the improvement which consists in drying the sludge, then burning the same, then condensing the resulting vapors to deposit the oxid, and then collecting the latter.

3. In the process of recovering arsenious oxid from the sulfid of arsenic sludge produced in sulfuric acid manufacture, the improvement which consists in burning the sludge, then condensing the resulting vapors to cause deposit of the oxid, and as a feature of such condensing operation so cooling the primary surfaces with which the vapors are brought into contact as to prevent the oxid from adhering thereto, and then collecting the oxid.

4. In the process of recovering arsenious oxid from the sulfid of arsenic sludge produced in sulfuric acid manufacture, the improvement which consists in burning the sludge, condensing the resulting vapors to deposit the oxid, and as a preliminary step in such condensing operation effecting a partial cooling of said vapors, and finally collecting the oxid.

5. In the process of recovering arsenious oxid from the sulfid of arsenic sludge produced in sulfuric acid manufacture, the improvement which consists in calcining the sludge, further heating the resulting vapors, and then condensing said vapors to cause deposit of the oxid, and, as a feature of such condensing operation, so cooling the primary surfaces with which the vapors are brought into contact as to prevent the oxid from adhering thereto, and finally collecting the oxid.

6. In the process of recovering arsenious oxid from the sulfid of arsenic sludge produced in sulfuric acid manufacture, the improvement which consists in calcining the sludge, further heating the resultant vapors, partially cooling said vapors, then further cooling the same to deposit the oxid, and then collecting the latter.

7. The process herein described of recovering arsenious oxid from the sulfid of arsenic sludge produced in sulfuric acid manufacture, said process consisting in first neutralizing the sludge, then drying the same, then burning said dried product, then condensing the resulting vapors to cause deposit of the oxid, and, as a feature of such condensing operation, so cooling the primary surfaces with which the vapors are brought into contact as to prevent the oxid from adhering thereto, and finally collecting the oxid.

8. The process herein described of recovering arsenious oxid from the sulfid of arsenic sludge produced in sulfuric acid manufacture, said process consisting in first neutralizing the sludge, then drying the same, then burning said dried product, then partially cooling the resulting vapors, then further cooling said vapors to deposit the oxid, and then collecting the latter.

9. The process herein described of recovering arsenious oxid from the sulfid of arsenic sludge produced in sulfuric acid manufacture, said process consisting in first neutralizing the sludge, then drying the same, then calcining said dried product, then subjecting the resulting vapors to further heating, then condensing said vapors to cause deposit of the oxid, and, as a feature of such condensing operation, so cooling the primary surfaces with which the vapors are brought in contact as to prevent the oxid from adhering thereto, and finally collecting the oxid.

10. The process herein described of recovering arsenious oxid from the sulfid of arsenic sludge produced in sulfuric acid manufacture, said process consisting in first neutralizing the sludge, then drying the same, then calcining said dried product, then subjecting the resulting vapors to further heating, then partially cooling said vapors, then further cooling the same to deposit the oxid, and finally collecting the latter.

In testimony whereof, I have signed my name to this specification, in the presence of two subscribing witnesses.

UTLEY WEDGE.

Witnesses:
  HAMILTON D. TURNER,
  KATE A. BEADLE.